United States Patent [19]

Portes et al.

[11] 4,261,966
[45] Apr. 14, 1981

[54] PROCESS FOR THE PREPARATION OF PIGMENT GRADE IRON OXIDES FROM FERROUS SULPHATE AND THE RESULTING $FE_2O_3$ PIGMENTS

[75] Inventors: Pierre Portes; Jean M. Trautmann; Daniel Hoffner, all of Thann, France

[73] Assignee: Thann et Mulhouse, Corp., Thann, France

[21] Appl. No.: 81,134

[22] Filed: Oct. 2, 1979

[30] Foreign Application Priority Data

Oct. 4, 1978 [FR] France ............................... 78 28939
Dec. 6, 1978 [FR] France ............................... 78 34975

[51] Int. Cl.³ .......................... C01G 49/06; C09C 1/24
[52] U.S. Cl. ...................................... 423/633; 106/304
[58] Field of Search ........................ 423/633; 106/304

[56] References Cited

U.S. PATENT DOCUMENTS

| 2,184,738 | 12/1929 | Fireman | 423/633 |
|---|---|---|---|
| 2,416,138 | 2/1947 | Ayers | 423/633 |
| 3,554,733 | 1/1971 | Columbo et al. | 423/633 |
| 3,619,137 | 11/1971 | Ratcliffe | 423/633 |
| 3,755,554 | 8/1973 | Lailach et al. | 423/633 |
| 3,812,242 | 5/1974 | Barilli et al. | 423/633 |
| 4,129,454 | 12/1978 | Pavonet | 423/633 |
| 4,139,398 | 2/1979 | Pellizzon et al. | 423/633 |

Primary Examiner—O. R. Vertiz
Assistant Examiner—Mark Bell
Attorney, Agent, or Firm—Lewis H. Eslinger

[57] ABSTRACT

Pigment grade $Fe_2O_3$ is prepared from ferrous sulphate by a roasting process. The ferrous sulphate, partly dehydrated and granulated, is partially converted to the oxide by roasting. After elimination of soluble constituents by washing with water, the oxide is subjected to pigmentary calcination and then crushed and optionally micronized. This process makes it possible to prepare red pigments of excellent quality characterized particularly by pure tints ranging from orange-red to purplish-red. The oil absorptions are especially low. Low toxic impurity concentrations permit the use of these pigments in foodstuffs.

19 Claims, No Drawings

PROCESS FOR THE PREPARATION OF PIGMENT GRADE IRON OXIDES FROM FERROUS SULPHATE AND THE RESULTING FE₂O₃ PIGMENTS

This invention relates to the preparation of pigment grade $Fe_2O_3$ from waste ferrous sulphate by a roasting process and the resulting $Fe_2O_3$ pigments.

Waste ferrous sulphate from certain chemical industries, particularly from pickling plants and the production of titanium dioxide by the sulphuric process, is a by-product the discharge of which raises ecological problems. Its neutralization is costly and generally results in unsaleable products, which also raise storage problems. For many years, processes have been proposed involving roasting of the waste iron sulphate to sulphur oxides which can be recycled for the production of sulphuric acid, but the ferric oxide also produced by this roasting is coarse and possesses inadequate pigment grade properties (see for example German Pat. No. 921,264). The production of sulphuric acid by this method is only competitive if the iron oxide which accompanies it is a high quality product, utilizable on the market, and this is only the case if the red $Fe_2O_3$ pigments produced have good colour purity.

Waste iron sulphates generally contain metallic impurities which, when roasted, combine with the iron oxide and lower its colour purity. It is true that processes designed to eliminate these impurities have already been described. This applies particularly to German Patent Application No. 11 44 248, which calls for roasting to convert 80 to 95% of the iron sulphate to the oxide, followed by washing, in the course of which certain cations such as Mn, which remain in the form of soluble salts, are eliminated. Following this treatment, pure $\alpha$ $Fe_2O_3$ is effectively obtained, but it has only mediocre pigment properties, owing to the fact that the roasting time/temperature combination required to eliminate the harmful cations fails to impart optimum dimensions to the oxide particles. Moreover, pigment preparation is not the purpose of German Patent Application 11 44 248, as the purified $\alpha$ $Fe_2O_3$ oxide serves only as a base for the subsequent preparation of $\gamma$ $Fe_2O_3$. Similar observations can be made in connection with U.S. Pat. Nos. 2,184,738 and 2,416,138.

Another process has also been described in French Pat. No. 2 296 671 in which the harmful metallic cations are eliminated by partial roasting followed by washing. However, this process is applied to a raw material other than iron sulphate jarosite. Moreover, the achievement of well defined pigment grade properties is subject to the precise adjustment of the partial pressure of $SO_2$ or oxygen in the furnace, and this is difficult to achieve on an industrial scale.

The purpose of this invention is to convert a known pollutant by-product, iron sulphate, into products which are re-usable or directly marketable: sulphur oxides which can be converted to sulphuric acid and good quality red iron pigments.

Accordingly the present invention provides a process for preparing a red $Fe_2O_3$ pigment which comprises partly dehydrating $FeSO_4.7H_2O$, granulating the partly dehydrated sulphate, roasting the granulated product to convert it to oxide, washing the roasted product, and subjecting the washed product to pigmentary calcination and crushing.

In effect, the process of the present invention employs a double roasting with intermediate washing, these operations being followed by crushing and optionally by micronization. The double roasting involves an initial roasting, which may or may not be performed in the presence of a reducing agent, carried out on partially dehydrated $FeSO_4.7H_2O$, washing of this roasted product, followed by a second roasting, after the washing of the roasted product, which is a pigmentary calcination of the washed product. The final product after crushing is a red $Fe_2O_3$ pigment having excellent pigment grade characteristics. The first roasting is preferably performed so that about 90% ($\pm$5%) of the iron sulphate is converted to the oxide and the second roasting or pigmentary calcination is preferably performed at temperatures ranging from 750° to 1000° C.

A particularly advantageous method for carrying out the process of the present invention is described below.

Ferrous sulphate is generally available in the form of the heptahydrate. The direct introduction of this salt into a furnace raises problems because, by melting at less than 100° C., it easily forms crusts which are detrimental to satisfactory operation of the furnace. Hence it is preferable to feed the roasting furnace with a partially dehydrated salt, particularly the monohydrate. The latter must be used preferably in the form of granules 0.5 to 3 mm in diameter.

Roasting is carried out preferably in an externally heated furnace in order to avoid dilution of the sulphur oxides ($SO_2$, $SO_3$) by combustion gases ($CO_2$, $N_2$, excess $O_2$) so as to enable their use for the production of sulphuric acid. It may be assumed that the reaction occurs as follows:

$$2FeSO_4 \times H_2O \rightarrow Fe_2O_3 + SO_2 + SO_3 + 2H_2O \qquad (1)$$

The temperature/furnace residence time combination is selected so that about 90$\pm$5% of the iron present is converted to the oxide, the rest remaining in soluble form. This is a compromise whereby almost all the harmful impurities such as Mn, Mg and Co remain in soluble form, while achieving a satisfactory conversion yield to $Fe_2O_3$. This result is obtained at temperatures ranging from 650° to 800° C., and residence times ranging from 10 minutes to 10 hours.

Roasting is improved if a certain amount of reducing agent (designated by the symbol R) is incorporated with the iron sulphate, such as carbon, sulphur or a hydrocarbon. The role of the reducing agent is to shift the equilibrium relation (1) to the right by the elimination of $SO_3$ by a reaction of the type:

$$SO_3 + R \rightarrow SO_2 + RO \qquad (2)$$

The reducing agent is preferably used in an amount which is 0.1 to 2 times, particularly 1 and 1.5 times, the stoichiometric amount. A particularly advantageous reducing agent is sulphur. In this case, the roasting reaction becomes:

$$4FeSO_4 \times H_2O + S \rightarrow 2Fe_2O_3 + 5SO_2 + 4H_2O \qquad (3)$$

Within the limits of unavoidable air infiltration into the furnace, it can be seen that the use of sulphur as reducing agent helps to obtain gases which are especially rich in sulphur oxide because, by the use of an indirectly heated furnace, the only diluent is water vapour. The advantage offered by the use of a reducing agent resides in the fact that the necessary roasting temperature can be lowered by some 100° C., thus lengthening the service life of the refractory metal which is used to line the furnace interior to facilitate heat transfers. Another advantage lies in the production of a non-oxidising atmosphere, which also enhances the behaviour of the metallic lining. The use of sulphur is also especially advantageous because, apart from its beneficial effect on the heat balance, the costs of additional raw materials are offset by the corresponding sulphuric acid obtained.

The solids and gases should preferably be in co-current flow in the roasting furnace, so that the sulphur which is distilled at the furnace inlet is able to oxidize in contact with the solids, or in the gas phase itself before being able to escape.

The roasting is preferably a continuous process in an externally heated furnace with the solid product obtained and the roasting gases being collected continuously at the same end of the furnace. The substance obtained at the furnace outlet is in the form of granules with dimensions approaching those of the dry iron sulphate charged initially into the furnace, and mainly contains $Fe_2O_3$ accompanied by about 10% iron remaining in the soluble state. The harmful impurities such as Mn, Mg and Co remain in soluble form. After purification, the sulphur oxides leaving the furnace may be recovered for the production of sulphuric acid.

The roasted product is washed with water, but in order to obtain neutral pigments more easily, it may be more advantageous to supplement this washing by hot alkaline treatment, for example with 0.1 N caustic soda, followed by a second washing with water. Washing may preferably be carried out in stationary bed with upward water flow, or even better on strip filters and, in a more general manner, with any suitable system which does not subject the granules to mechanical stresses which are liable to destroy them.

After washing and drying, the iron oxide generally contains over 97% $Fe_2O_3$. The only impurities remaining in significant proportions are Ti (in the case of iron sulphate from ilmenite) and S. The latter is subsequently eliminated by the final calcination of the oxide. The presence of $TiO_2$ up to concentrations of 2% is not detrimental for the pigment grade properties of the finished product. The washed and dried product obtained at this stage still only possesses very inadequate pigment grade properties, because the oxide particles are not yet of suitable size. It is well known that particle size is an important factor influencing pigment characteristics.

The second roasting or pigmentary calcination is advantageously performed in a directly heated furnace, but any other furnace allowing gas flow above the product is suitable. The gases and solids should preferably be in countercurrent flow in this furnace, so as to evacuate the waste sulphur oxides satisfactorily, and thus to ensure that the finished product has satisfactory pH and resistivity. The temperature and residence time are suitably selected in order to obtain the desired red pigment shade: lower temperatures e.g. 750° to 820° C., yield small orange-red crystals, the higher temperatures, e.g. 900° to 1000° C., yield larger purplish-red crystals. Neutral red tints, lying between orange-red and purplish-red, are generally obtained at intermediate temperatures e.g. 820° to 900° C. A pigment range of particular importance is obtained by calcination for 1 to 10 hours at a temperature of 750° to 1000° C.

At the outlet of the calcination furnace, the product is cooled and undergoes crushing in routine conditions prevailing in the inorganic pigment industry. Micronization can optionally be used to supplement grinding, to ensure excellent dispersability of the pigment in binders, and greater brilliancy of the lacquers pigmented with this oxide.

This invention thus provides a process whereby waste iron sulphate can be utilised both for the production of sulphuric acid and also for the production of high pigment grade iron oxide. It enables the production of $Fe_2O_3$ pigments containing less than 0.05% Mn and less than 5 mg/Kg Zn where the starting material contains more than 0.15% Mn and more than 0.01% Zn (percentages are by weight). One particular advantage of the process is that it produces a wide range of red pigment tints by means of variations in a parameter which is easy to control, that is the final calcination temperature. The elimination of harmful impurities by the process also offers the advantage of giving these pigments a colour purity which makes them at least comparable to the best red pigments available on the market. The pigments thus obtained have a colorant power equal to or greater than concurrently marketed $Fe_2O_3$ pigments. Other characteristics of the pigments produced by the invention process are far superior to those of existing pigments. Thus by the process of the present invention it is possible to obtain such red pigments which are orange-red to purplish-red and have an oil absorption which is less than half of that of available pigments, in particular less than 12.5 especially less than 10.5, determined in accordance with AFNOR (Association Francaise de Normalisation) Standard T 30-022 and these pigments also form part of the present invention. This lower oil absorption offers an economic and ecological benefit, because it is possible to use less solvent in paints containing this oxide, while obtaining the same vicosity. As illustrated in the Examples given below, the pigments of the present invention which have the given oil absorption can be produced with a resistivity exceeding 4000 ohm × cm, and also, when incorporated in an oily binder, the brilliancy of the resulting paint film (measured as hereinafter indicated) can be greater than 50. The chemical composition of the pigmens is another important advantage of this invention; using iron sulphate produced by the titanium pigment industry, the only impurity which can remain in a significant concentration is $TiO_2$, and $TiO_2$, within the 2% limit encountered in practice, is not harmful to colour purity.

The purity is particularly important if the pigments obtained are used to colour foodstuffs, packings and plastics. Such pigments are subject to maximum concentrations of toxic impurities established for foodstuffs by Article 8 of the Decree of 15 October 1964 published in the Journal Officiel dated 4 November 1964. The purification treatment inherent in the process of the invention contributes to eliminate some of these impurities contained in the waste iron sulphate which served as a raw material, so that the pigments obtained largely satisfy the legal purity requirements, whereas these limits are sometimes exceeded in commercially available pigments. The fact that the red pigments produced by the invention process satisfy legal purity requirements for their use in foodstuffs is a significant advantage over pigments currently available on the market.

These different advantages are illustrated by the following Examples. Precentages are by weight unless otherwise stated. Most testing methods employed are standard methods in the art. However, some of them have been specially developed and are clarified below.

For iron oxides, the determination of certain colorimetric properties is more sensitive if, instead of pigmenting resin with pure $Fe_2O_3$, a mixture of pigments is added to the resin, this mixture consisting of $Fe_2O_3$ with a $TiO_2$ pigment in given proportions.

This gives rise to so-called "shaded off" paint in which the $TiO_2$ plays the role of enhancing the colorimetric characteristics of the iron oxide. The rate of shading is defined by the weight ratio $Fe_2O_3/TiO_2+Fe_2O_3$. All the comparative tests were performed with a shading rate of 25%. The use of a second pigment such as $TiO_2$ in addition to $Fe_2O_3$ is also necessary to determine the tinting strength (TS) of this $Fe_2O_3$. The tinting strength may be defined by the equation:

$$TS = \frac{100 \times 25}{t}$$

where t is the shading rate which must be used with the test sample for the corresponding paint, checked by means of a colorimeter, to have the same Y filter reflectance as the reference pigment to which it is compared, the latter itself contained in a 25% shaded paint. For example, if, in order to obtain the same Y tint intensity as the reference oxide in the 25% shaded paint, the sample must be shaded off by 22%, the tinting strength of this sample in comparison with the reference is:

$$TS = \frac{100 \times 25}{22} = 113.6\%$$

In a qualitative manner, this may be summarized by saying that a sample of red pigment has greater tinting strength if it can be mixed in smaller amounts with a given mass of $TiO_2$ to obtain the same reference pink.

Another important characteristic of a pigment is the colour deviation $\Delta C$ which it exhibits in comparison with existing good quality products. A new oxide is considered to be satisfactory if, in relation to one of the existing commercial grades, it exhibits colour deviation not exceeding the limit corresponding to measurement accuracy (or $\Delta C$ about 1.5) and if, moreover, its tinting strength is greater than or equal to that of the known pigment. Colour deviations $\Delta C$ taken into consideration in the following Examples have been measured as follows: alkyd resin base paint samples are prepared with a 25% shading rate with each of the known oxides, and the corresponding trichromatic coordinates X, Y, Z are measured; using the same formulation, the pigment obtained by the invention process is added to the binder, and the reflectances are measured with tristimuli filters X, Y, Z. The colour deviation $\Delta C$ is then determined (in MacAdam units, National Bureau of Standards, Draft Standard ASTM D 2244-64T) between the sample and the different known oxides. Among known pigments, the one against which the oxide prepared by the invention process is best compared is the one which most closely approaches it in chromaticity, i.e. the one which exhibits the smallest colour deviation in relation to it. This determination of the known pigment which most closely approaches a given sample requires time consuming calculations which can be carried out successfully with the use of a microcomputer. If $\Delta C$ is lower than 1.5, it is considered that the difference between the sample and the reference is insignificant, i.e. that the colour purity of the sample is as good as that of the known reference pigment. All comparisons presented in the Examples deal with pigments prepared in accordance with known processes or by the invention process, as compared with their commercial counterpart with the nearest chromaticity. One of the particularly interesting elements of this comparison is the value of the Z component given by the colorimeter, because this is characteristic of the tonality of the red obtained. With 25% shading, quality pigments currently available on the market cover an interval ranging from about $Z=15$ (for orange tonalities) to $Z=38$ (for the most purplish tonality).

The dispersibility of the pigments, expressed in microns, is measured by a North gauge after 5 and 30 minutes of crushing of the oxide in alkyd medium, in the presence of 4 mm diameter glass balls. The lower these values, the finer the crushing and hence the better the dispersibility.

The pH of the pigments is measured in accordance with AFNOR Standard T 30-035. It is generally considered that pigments of which the aqueous extract has a pH from 5 to 9 are satisfactory. The aqueous suspensions obtained by working in accordance with this Standard have also served to determine indirectly the soluble salt content of the finished product. To do this, the resistivity of the aqueous extract is measured: the higher the resistivity, the lower the soluble salt content.

Oil absorption is determined in accordance with AFNOR Standard T30-022. The figures expressing the oil absorption represent the rate of oil required to obtain a firm, smooth paste with 100 g of pigment.

Brilliancy is measured with a Zeiss GP 2 brilliancy meter, at an angle of incidence of 20°, on oven baked alkyd paints, with a volumetric pigment concentration of 16. The higher this figure, the better the brilliancy.

COMPARATIVE EXAMPLE A

The raw material employed was a ferrous sulphate obtained from $TiO_2$ production by the sulphuric method, characterized by a $Mn/Fe_2O_3$ ratio of 0.63%. Its more complete analysis is as follows:

$FeSO_4.7H_2O$ 94%, Fe 19%, $SO_4$ 34.75%, Mn 0.18%, Ti 0.13%, Mg 0.20, Zn 0.02%, Co 0.003%. An iron oxide free of solubilizable impurities was prepared in accordance with the German Patent Application No. 11 44 248. The previously dehydrated salt aggregated to form 3 mm diameter granules was roasted until a conversion rate to $Fe_2O_3$ of 91.7% was obtained; roasting lasted 15 minutes at 800° C. The roasted product was subjected to intensive washing with water, dried and crushed, then subjected to the series of pigment and analytical tests. The results are given in Table 1 (Comparative Example A, Column e). It may be seen that the chemical purity is satisfactory. On the other hand, certain essential pigment grade properties are clearly deficient. The comparison with an existing range of commercial high quality red pigments shows that the sample prepared in accordance with German Patent Application No. 11 44 248 most closely resembles the most orange pigment ($Z=14$) (column h), but that, even in comparison with this pigment, it exhibits a high chromatic deviation ($\Delta C=2.6$). This procedure fails to produce pigments characterized by Z values higher than about 14; the neutral or purplish reds are therefore unobtainable. It may also be observed that the pH falls outside the standard limits, and the soluble salt content is fairly high, so that the oxide thus obtained fails to meet the requirements for a commercial pigment.

COMPARATIVE EXAMPLE B $FeSO_4.7H_2O$ from the same source as that of Comparative Example A was partially dehydrated and granulated in a Niro Atomizer (Copenhagen) spray granulator. The $\frac{1}{3}$ mm diameter $FeSO_4.H_2O$ spherules obtained were introduced by a worm screw continuously at the rate of 4 kg per hour into a 2 meter long horizontal rotary furnace. The solids travel in a 20 cm diameter NS 30 refractory steel tube, externally heated by gas by means of a Meker burner rack subjected to automatic temperature control. The partially roasted iron sulphate and roasting gases are withdrawn at the same end of the furnace. The average residence time of the solid in the urnace is $1\frac{1}{2}$ hours. The furnace temperature was regulated to 790° C. The oxide obtained was crushed and subjected to different tests. The results in Table 1 show that the commercial pigment most closely approaching this oxide is characterized by a Z of 17.5 with 25% shading. In comparison with this commercial oxide, the pigment prepared in Comparative Example B exhibits a large chromatic deviation ($\Delta C = 3.9$) which reflects the lack of purity caused by foreign cations. Furthermore, this oxide has a sharply acidic pH and a high soluble salt content. It may be noted that owing to its high Zn content, this oxide does not meet the maximum concentration requirements imposed by the Decree of Oct. 15, 1964. The product thus obtained is consequently not a quality pigment.

EXAMPLE 1

Ferrous sulphate from the same source as that used in Comparative Examples A and B was dried and granulated as indicted in Comparative Example B. The granules were mixed with crushed sulphur in the ratio $S/FeSO_4.H_2O = 5\%$. This mixture was introduced continuously by means of a suitable worm screw into the roasting furnace used in Comparative Example B. The furnace temperature was 670° C. and average residence time was $1\frac{1}{2}$ hours. The fraction insolubilized Fe/total Fe was 91%. The roasted granules were placed on a Buchner, where they underwent washing by upward water flow up to a total elimination of the soluble iron. The product was then placed in contact with boiling 0.1 N caustic soda, and then washed again with water. The washed product was oven dried and then calcined in a second horizontal furnace provided with vigorous counter-current air flushing. The temperature was 820° C., average residence time was $1\frac{1}{2}$ hours, and the washed and dried oxide feed rate was 2 kg/hour. After cooling, the oxide was crushed in a ball mill and micronized.

Table 1 shows that the pigment obtained has a chromaticity closely approaching ($\Delta C = 0.6$) that of a commercial quality pigment with a tonality leaning towards orange ($Z = 15$). However, the tinting strength of the sample prepared by the invention process is greater (113). The oil absorption of 10.1 is much more favourable than that of the similar pigment available on the market (28). A clear advantage in brilliancy can also be observed. Very large differences also appear in harmful element contents, for which maximum allowable limits in pigments intended for colouring foodstuffs are established by the Ministerial Decree of Oct. 15, 1964. Contrary to the corresponding commercial pigment, the impurity concentrations of the oxide in Example 1 are lower than the imposed maximum concentrations. (These maximum concentrations are noted in the right hand column of Tables 1 and 2).

Thus it may be seen that the pigment prepared by the invention process exhibits significant advantages over a corresponding good quality pigment currently available on the market.

EXAMPLE 2

This Example was carried out in the same way as Example 1, the only difference being that the temperature of pigmentary calcination was 845° C. instead of 820° C. The chemical and pigment grade characteristics of this sample, shown in Table 2, show that, as in the previous Example, the slightly orange red pigment obtained offers significant advantages over its equivalent currently available pigment.

EXAMPLE 3

This example was carried out as in Examples 1 and 2, the only difference being that the pigmentary calcination temperature was 880° C. The pigment obtained was crushed in a ball mill but not micronized. This yielded a red pigment offering the advantages already mentioned in Example 1 over a standard pigment (see Table 2).

EXAMPLE 4

This example was carried out as in Example 3, but the calcination temperature was 960° C. The pigment thus obtained is a clear purplish-red, corresponding to the other extreme of the $Fe_2O_3$ red pigments on the market. Here again, Table 2 shows the many characteristics for which the pigment produced by the invention process is superior to its known equivalents.

TABLE 1

| characteristics | Comparative Example A | | Comparative Example B | | Example 1 | | (a) imposed max concentrations |
|---|---|---|---|---|---|---|---|
| | e | h | e | h | e | h | |
| A: shaded off | 21.9 | 25 | 26.1 | 25 | 22.2 | 25 | |
| B: coordinates | | | | | | | |
| Y | 22.9 | 22.9 | 20.0 | 20.0 | 21.0 | 21.0 | |
| X | 30.2 | 29.6 | 25.4 | 26.0 | 27.9 | 27.8 | |
| Z | 13.0 | 14.0 | 15.2 | 17.5 | 15.1 | 15.0 | |
| C: chromatic deviation $\Delta C$ | 2.6 | | 3.9 | | 0.6 | | |
| D: tinting strength | 114 | 100 | 96 | 100 | 113 | 100 | |
| E: oil absorption | 25.4 | 29 | 10.5 | 26 | 10.1 | 28 | |
| F: brilliancy | 29 | 21 | 28 | 30 | 58 | 20 | |
| G: fineness in $\mu$ | | | | | | | |
| 5 min | 95 | 75 | 90 | 65 | 80 | 80 | |
| 30 min | 40 | 37 | 35 | 35 | 35 | 40 | |

TABLE 1-continued

| characteristics | Comparative Example A | | Comparative Example B | | Example 1 | | (a) imposed max concentrations |
|---|---|---|---|---|---|---|---|
| | e | h | e | h | e | h | |
| H: pH | 2.6 | 7.4 | 2.9 | 5.7 | 6.3 | 7.5 | |
| I: resistivity kohn × cm | 0.7 | 7.2 | 1.0 | 5.1 | 4.6 | 7.0 | |
| % $Fe_2O_3$ | 96.1 | 96 | 96.0 | 96 | 97.0 | 96 | |
| % Mn | 0.01 | 0.07 | 0.6 | 0.09 | 0.02 | 0.09 | |
| As mg/kg | 1.1 | 150 | 4 | 95 | 1 | 140 | 5 |
| Pb mg/kg | <2 | 74 | 2 | 72 | <2 | 79 | 20 |
| Sb mg/kg | <25 | <25 | <25 | <25 | <25 | <25 | 100 |
| Cu mg/kg | 5 | 524 | 6 | 690 | 4 | 520 | 100 |
| Cr mg/kg | 8 | 555 | 7 | 835 | <5 | 500 | 100 |
| Zn mg/kg | 6 | 437 | 600 | 420 | <5 | 405 | 100 |
| $SO_4Ba$ mg/kg | <5 | 1000 | <5 | 100 | <5 | 950 | 100 |

The key to symbols used in Table 1 are given after Table 2.

TABLE 2

| characteristics | Example 2 | | Example 3 | | Example 4 | | (a) imposed max concentrations |
|---|---|---|---|---|---|---|---|
| | e | h | e | h | e | h | |
| A: shaded off | 22.4 | 25 | 23.0 | 25 | 23.3 | 25 | |
| B: coordinates | | | | | | | |
| Y | 20.1 | 20.1 | 22.2 | 22.2 | 30.3 | 30.3 | |
| X | 25.7 | 26.0 | 26.6 | 26.7 | 32.7 | 32.7 | |
| Z | 17.6 | 17.8 | 24.3 | 24.5 | 37.5 | 38.0 | |
| C: chromatic deviation ΔC | 1.1 | | 0.6 | | 0.5 | | |
| D: tinting strength | 111 | 100 | 109 | 100 | 107 | 100 | |
| E: oil absorption | 9.4 | 25 | 9.0 | 22 | 9.5 | 15 | |
| F: brilliancy | 76 | 35 | 50 | 29 | 32 | 16 | |
| G: fineness in μ | | | | | | | |
| 5 min | 60 | 60 | 80 | 55 | 62 | 37 | |
| 30 min | 22 | 30 | 30 | 27 | 37 | 27 | |
| H: pH | 6.5 | 5.7 | 6.2 | 5.4 | 7.6 | 7.0 | |
| I: resistivity kohm × cm | 5.1 | 7.0 | 16 | 10 | 18 | 18 | |
| % $Fe_2O_3$ | 97.2 | 96 | 97.2 | 96 | 97 | 96 | |
| % Mn | 0.03 | 0.09 | 0.01 | 0.12 | 0.04 | 0.07 | |
| As mg/kg | 1.5 | 100 | 2 | 80 | 1.8 | 75 | 5 |
| Pb mg/kg | <2 | 68 | <2 | 70 | <2 | 64 | 20 |
| Sb mg/kg | <25 | <25 | <25 | <25 | <25 | <25 | 100 |
| Cu mg/kg | 6 | 727 | 5 | 415 | 6 | 354 | 100 |
| Cr mg/kg | <5 | 869 | <5 | 612 | <5 | 426 | 100 |
| Zn mg/kg | <5 | 424 | <5 | 395 | <5 | 211 | 100 |
| $BaSO_4$ mg/kg | <5 | 50 | <5 | 1500 | <5 | 3200 | 100 |

Key to Tables 1 and 2
A shading rate t (in %) to be used with the sample (e) to obtain the same Y as for the equivalent commercial pigment with 25% shading off (h)
B trichromatic coordinates at t shading % for the sample (e) and with 25% shading for its commercial equivalent (h)
C chromatic deviation ΔC between the sample in the example (e) and its commercial equivalent (h)
D tinting strength of the sample (e) in comparison with its commercial equivalent (h): TS = 2500/t
E oil absorption (g of oil per 100 g of pigment)
F brilliancy
G crushing fineness in microns measured after 5 and 30 minutes of crushing in the presence of balls
H pH determined in accordance with AFNOR Standard T 30-035
I resistivity of the aqueous extract expressed in kilohms . cm
e characteristics of the pigment described in the Example
h characteristics of the commercial pigment with the closest chromaticity
a maximum concentrations of toxic impurities imposed by Ministerial Decree of 15 October 1964 (French Journal Officiel dated 4 November 1964) relative to substances usable for colouring foodstuffs For all the pigments presented in Tables 1 and 2, the impurities Cd, Hg, Se, Tl, U, $CrO_4^{2-}$, $Ba^{2+}$ and organic constituents are either undetectable or in a concentration lower than the maximum limits imposed by the above Decree.

We claim:

1. A process for preparing a red $Fe_2O_3$ pigment which comprises
   (1) partly dehydrating $FeSO_4.7H_2O$;
   (2) granulating the partly dehydrated sulphate;
   (3) converting the granulated product to an oxide by roasting the granulated product at 550° to 800° C. for 10 minutes to 10 hours in a furnace from which entry of air is substantially prevented;
   (4) washing the roasted product with water;
   (5) subjecting the washed product to pigmentary calcination with flushing of air at 750° to 1000° C. for 1 to 10 hours and (6) crushing the calcined product.

2. A process according to claim 1 wherein 90%±5% of the sulphate is converted to the oxide by roasting.

3. A process according to claim 1 wherein the roasting is performed continuously in an externally heated furnace and the solid product and roasting gases are collected continuously at the same end of the furnace, the gases being used for the production of sulphuric acid.

4. A process according to claim 1 wherein the roasting is performed in the presence of a reducing agent.

5. A process according to claim 4 wherein the reducing agent is sulphur.

6. A process according to claim 5 wherein the sulphur is used in an amount which is 0.1 to 2 times the stoichiometric amount.

7. A process according to claim 6 wherein the sulphur is used in an amount which is 1 to 1.5 times the stoichiometric amount.

8. A process according to claim 1 wherein the roasted product is washed in conditions which avoid mechanical destruction of the granules produced by roasting.

9. A process according to claim 1 wherein the washing is carried out by treating the granulated product with water, then with a hot alkaline solution and then again with water.

10. A process according to claim 1 wherein the pigmentary calcination is carried out in a furnace flushed by a gas flowing in a countercurrent direction to the iron oxide.

11. A process according to claim 1 wherein an orange-red tonality pigment is obtained.

12. A process according to claim 11 wherein the pigmentary calcination is carried out at 750° to 820° C.

13. A process according to claim 1 wherein a red tonality pigment is obtained.

14. A process according to claim 13 wherein the pigmentary calcination is carried out at 820° to 900° C.

15. A process according to claim 1 wherein a purplish-red tonality pigment is obtained.

16. A process according to claim 15 wherein the pigmentary calcination is carried out at 900° to 1000° C.

17. A process according to any one of the preceding claims wherein after the pigment is crushed it is subjected to micronization.

18. A process according to claim 1 wherein the $FeSO_4.7H_2O$ is waste material from a pickling plant or from $TiO_2$ production.

19. A process according to claim 1 wherein the $FeSO_4.7H_2O$ starting material contains more than 0.15% Mn and/or more than 0.01% Zn and the final product contains less than 0.05% Mn and/or less than 5 mg/Kg Zn.

* * * * *